United States Patent
Linehan et al.

(10) Patent No.: US 10,747,205 B2
(45) Date of Patent: Aug. 18, 2020

(54) ELECTRONIC TOOL AND METHOD FOR COPYING A PLURALITY OF SETTINGS FROM A MECHANICAL TOOL TO ANOTHER MECHANICAL TOOL

(71) Applicant: INGERSOLL-RAND COMPANY, Davidson, NC (US)

(72) Inventors: John J. Linehan, Jamison, PA (US); Ashok Muralidhar, Bridgewater, NJ (US); Manivasagan Krishna Pillay, Bangalore (IN); Madhusudhana Rao Rao R V, Bangalore (IN); Habibullah, Allentown, PA (US)

(73) Assignee: Ingersoll-Rand Industrial U.S., Inc., Davidson, NC (US)

( * ) Notice: Subject to any disclaimer, the term of this patent is extended or adjusted under 35 U.S.C. 154(b) by 80 days.

(21) Appl. No.: 15/983,990

(22) Filed: May 18, 2018

(65) Prior Publication Data
US 2019/0354085 A1   Nov. 21, 2019

(51) Int. Cl.
*G05B 19/00*    (2006.01)
*G05B 19/4155*  (2006.01)

(52) U.S. Cl.
CPC ......... *G05B 19/4155* (2013.01); *G05B 2219/35513* (2013.01)

(58) Field of Classification Search
CPC ............. G05B 19/4155; G05B 2219/35513
See application file for complete search history.

(56) References Cited

U.S. PATENT DOCUMENTS

| 8,862,548 | B2 | 10/2014 | MacDonell et al. |
| 9,071,627 | B2* | 6/2015 | Buck .................. H04L 67/1095 |
| 2013/0102963 | A1 | 4/2013 | Marsh et al. |
| 2016/0342151 | A1* | 11/2016 | Dey, IV .................. B25F 5/00 |
| 2017/0054615 | A1 | 2/2017 | Wilson |
| 2017/0083014 | A1* | 3/2017 | Conrad .................. B25B 21/02 |
| 2019/0018992 | A1* | 1/2019 | Bizoara ............. G06K 7/10722 |
| 2019/0227528 | A1* | 7/2019 | Abbott ...................... B25F 5/00 |

FOREIGN PATENT DOCUMENTS

| EP | 2866106 A1 | 4/2015 |
| TW | I622466 B | 5/2018 |

OTHER PUBLICATIONS

European Patent Office, Extended European Search Report in corresponding application No. 19174521.5, dated Oct. 14, 2019, 9 pp.

* cited by examiner

*Primary Examiner* — Khai M Nguyen
(74) *Attorney, Agent, or Firm* — Taft Stettinius & Hollister LLP (57) ABSTRACT

An electronic tool for copying a plurality of settings from a first mechanical tool to a second mechanical tool comprises: a smart device having a processor, and having a non-transitory memory storing program instructions executable on the processor. The program instructions are configured, when executed on the processor, to: read the plurality of settings from the first mechanical tool; and write the plurality of settings to the second mechanical tool.

20 Claims, 8 Drawing Sheets

ELECTRONIC TOOL AND METHOD FOR COPYING A PLURALITY OF SETTINGS FROM A MECHANICAL TOOL TO ANOTHER MECHANICAL TOOL

TECHNICAL FIELD

The present application generally relates to mechanical tools and more particularly, but not exclusively, to a method and electronic tool for copying a plurality of settings from a mechanical tool to another mechanical tool.

BACKGROUND

Mechanical tools of various types, e.g., battery powered or electrically powered mechanical tools for applying fasteners, remain an area of interest. Some existing systems have various shortcomings, drawbacks and disadvantages relative to certain applications. For example, in some mechanical tools, settings, such as tool settings or other settings, are time consuming to apply to a replacement mechanical tool in the event of a failure of the original mechanical tool. Accordingly, there remains a need for further contributions in this area of technology.

SUMMARY

One embodiment of the present invention is a unique method for copying a plurality of settings from a first mechanical tool to a second mechanical tool. Another embodiment is a unique electronic tool for copying a plurality of settings from a first mechanical tool to a second mechanical tool. Other embodiments include apparatuses, systems, devices, hardware, methods, and combinations for copying a plurality of settings from a one mechanical tool to a another mechanical tool. Further embodiments, forms, features, aspects, benefits, and advantages of the present application shall become apparent from the description and figures provided herewith.

BRIEF DESCRIPTION OF THE FIGURES

The description herein makes reference to the accompanying drawings wherein like reference numerals refer to like parts throughout the several views, and wherein.

DETAILED DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figures 1, 2, 3:
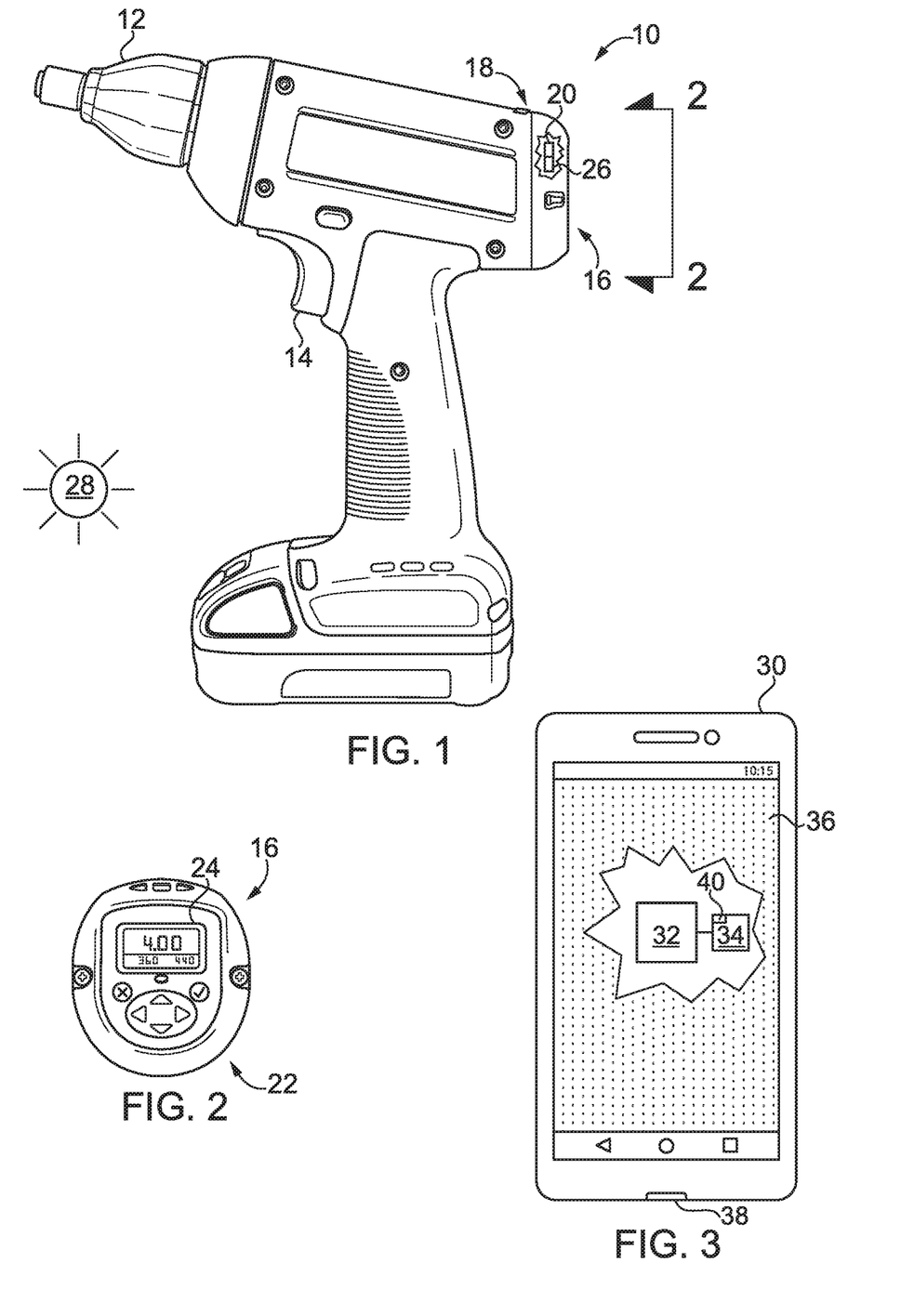
FIG. 1 illustrates some aspects of a non-limiting example of a mechanical tool in accordance with an embodiment of the present invention.
FIG. 2 illustrates some aspects of a non-limiting example of a mechanical tool in accordance with an embodiment of the present invention.
FIG. 3 illustrates some aspects of a non-limiting example of an electronic tool for copying settings from one mechanical tool to another mechanical tool in accordance with an embodiment of the present invention.

Referring to FIGS. 1 and 2, some aspects of a non-limiting example of a mechanical tool 10 in accordance with an embodiment of the present invention is illustrated. Mechanical tool 10 is a mechanical tool that performs mechanical tasks. The mechanical tool may be motorized. For example, in one form, mechanical tool 10 is a precision fastening tool, such as a powered torque driver or screw driver. In one form, mechanical tool 10 is battery powered. In other embodiments, mechanical tool 10 may be supplied with power from an electric grid. In various embodiments, mechanical tool 10 may be a handheld tool or may be fixed in place. In some embodiments, mechanical tool 10 is an industrial mechanical tool used for industrial purposes, in contrast to a home-use tool. In other embodiments, mechanical tool 10 may be a home-use tool.

Mechanical tool 10 includes a driver head 12, a switch 14, a control panel 16, a communication port 18 and a memory 20, e.g., located in or beneath control panel 16, although memory 20 may be disposed at any suitable location on or within mechanical tool 10. Communication port 18, e.g., a USB, mini USB, micro USB or other communications port is communicatively coupled to control panel 16 and to memory 20.

Driver head 12 is operative to drive fasteners, e.g., up to a predefined speed and/or predefined torque values based on a plurality of settings (as used herein, "settings" includes settings and parameters), e.g., stored in memory 20. In other embodiments, driver head 12 may take other forms for performing any suitable mechanical function. Switch 14 is operative to control the output of driver head 12, e.g., to turn driver head 12 on or off. In some embodiments, switch 14 is a variable switch, and is constructed to vary the output, e.g., rotational speed, of driver head 12. Driver head 12 is controlled by switch 14 based on the plurality of settings stored in memory 20. Some or all of the plurality of settings may be displayed on a display panel 24 associated with control panel 20. Some embodiments may not include a display 24. The present invention is applicable to embodiments having a display 24 and to embodiments not having a display, such as display 24. Some or all of the plurality of settings may be stored in memory 20 by manual entry using keys 22 on control panel 16. Alternatively, some or all of the plurality of settings may be transferred to memory 20 via communications port 18. Mechanical tool 10 includes a built-in wireless communicator or transceiver 26 operative to communicate wirelessly, e.g., with a wireless gateway 28, e.g., for network access to production control/reporting, the provision of tool 10 status, the adjustment of mechanical tool 10 settings/parameters and other functions.

In some circumstances, mechanical tool 10 may not be available for use, e.g., due to maintenance, a mechanical failure, an electronic component failure or a motor failure, in which case it is desirable to use a replacement tool that has all or substantially all of the same settings. The total number of settings to program into the replacement mechanical tool may exceed 100, depending on, for example, the complexity of fastening steps and operations used in the production station where mechanical tool 10 is being used. Although the settings may be entered manually, potential human error, e.g., related to typing the settings or failing to update parameters may yield undesirable results. Also, manual entry of the settings may be time consuming, requiring the production station to be idle while the settings are programmed. In some cases, the settings may be kept in an electronic document or hard-copy. However, the electronic document or hard copy may not have been kept up to date. In such circumstances, even if all the settings were entered correctly, the replacement mechanical tool 10 may not operate as expected if there is data discrepancy between the failed tool and available document, i.e., discrepancy in the settings.

Some aspects of the present disclosure address the problem of copying settings from the original mechanical tool 10, e.g., a failed tool or a tool that is receiving maintenance, to a replacement tool, quickly and reliably. The initial mechanical tool 10 may be referred to as the source tool, and the replacement mechanical tool 10 may be referred to as the destination tool, since the settings are transferred from the initial mechanical tool 10 (source mechanical tool 10) to the replacement mechanical tool 10 (destination mechanical tool 10). With previous systems, it might take up to, or more than, 45 minutes in some cases to copy settings from a failed tool to a replacement tool by using computer based software or manual entry to copy the settings. In some embodiments, an electronic tool may be provided to copy the settings from the source mechanical tool 10 to the destination mechanical tool 10, i.e., the replacement tool.

Referring also to FIG. 3, some aspects of a non-limiting example of an electronic tool 30 are schematically illustrated. Electronic tool 30 is configured to interface with a source mechanical tool 10 and with a destination mechanical tool 10. Electronic tool 30 includes a processor 32, a memory 34, a graphical user interface 36 in the form of a touchscreen display, and a communications port 38. Processor 32 is communicatively coupled to memory 34 and to graphical user interface 36. In some embodiments, some or all of memory 34 may be a part of processor 32. Processor 32 and memory 34 are communicatively coupled to communications port 38. Communications port 38 is constructed to communicatively couple electronic tool 30 to one or more mechanical tools 10.

Graphical user interface 36 is operative to receive user input, e.g., via clicks or taps with a human thumb and/or finger or by use of a stylus, to copy a plurality of settings from the source mechanical tool 10 to the destination mechanical tool 10. In various embodiments, graphical user interface 36 may be a single touch or multi-touch touchscreen display. In one form, electronic tool 30 is a smart device. One non-limiting example of a smart device is a smart phone, e.g., an Android®-based smart phone. In other embodiments, electronic tool 30 may be another type of smart phone, a smart tablet, another commercially available processor-based device, or a dedicated electronic tool that is constructed to perform the reading and writing disclosed herein. Some embodiments may also be constructed to perform the cancel and/or factory or other reset procedures disclosed herein.

In one form, an app 40 (application, e.g., a software application) is installed onto electronic tool 30 in order to copy the settings from one mechanical tool 10 to another mechanical tool 10. App 40 may be stored in a suitable memory, e.g., in memory 34. App 40 may be downloaded onto electronic tool 30 by various means, including wirelessly, e.g., from a non-transitory computer readable storage medium readable by a processor and storing program instructions executable on a processor such as processor 32 to copy a plurality of settings from a one mechanical tool 10 to another mechanical tool 10 using electronic tool 30. In some embodiments, memory 34 may be a non-transitory computer readable storage medium readable by processor 32 and storing program instructions executable on processor 32 to copy a plurality of settings from a first mechanical tool 10 to a second mechanical tool 10 using electronic tool 30.

For example, in some embodiments, smart app 40 may be developed for smart devices, such as smart phone & tablet devices, to copy the settings from the source mechanical tool 10 to the destination mechanical tool 10. A user may use app 40 to copy all the appropriate settings from the source mechanical tool 10 to the destination mechanical tool 10, so that the replacement mechanical tool 10 will function the same as the original mechanical tool 10. Although described herein as copying the requisite settings from a failed mechanical tool 10 to a replacement mechanical tool 10, it will be understood that electronic tool 30 may be used to copy the settings from any desired mechanical tool 10 to any other one or more desired mechanical tools 10. By using the app 40 to copy settings, e.g., as opposed to manual entry, the likelihood of human error is reduced. In one form, the smart phone or tablet device does not need to have phone service or Wi-Fi connectivity, but rather may connect with the mechanical tools 10 via a wired connection, such as a serial USB cable, or a wireless connection, such as Bluetooth or near-field communication, or other wireless or wired communication protocols. In other embodiments, Wi-Fi or wireless communication protocols may be employed to copy (or write) the settings. In some embodiments, app 40 may generate a simple-to-follow single screen that may be used to read the settings from the source mechanical tool 10, e.g., within a few seconds, and may be used to write the same data to the destination mechanical tool 10, e.g., within 30 seconds. In some embodiments, the entire copying process may take under a minute, including physical connection and disconnection of the USB cable by the user. In some embodiments, the process may require as few as one or two clicks or taps on the smart device's graphical user interface touchscreen 36 in order to copy the settings from the source mechanical tool 10 and write the settings to the destination mechanical tool 10.

In some embodiments, electronic tool 30 is on-the-go (OTG) USB compatible. In some embodiments, e.g., where electronic tool 30 is a smart phone or smart tablet, USB OTG capability may be verified, for example, by use of a separate app, e.g., a free app.

Figure 4:
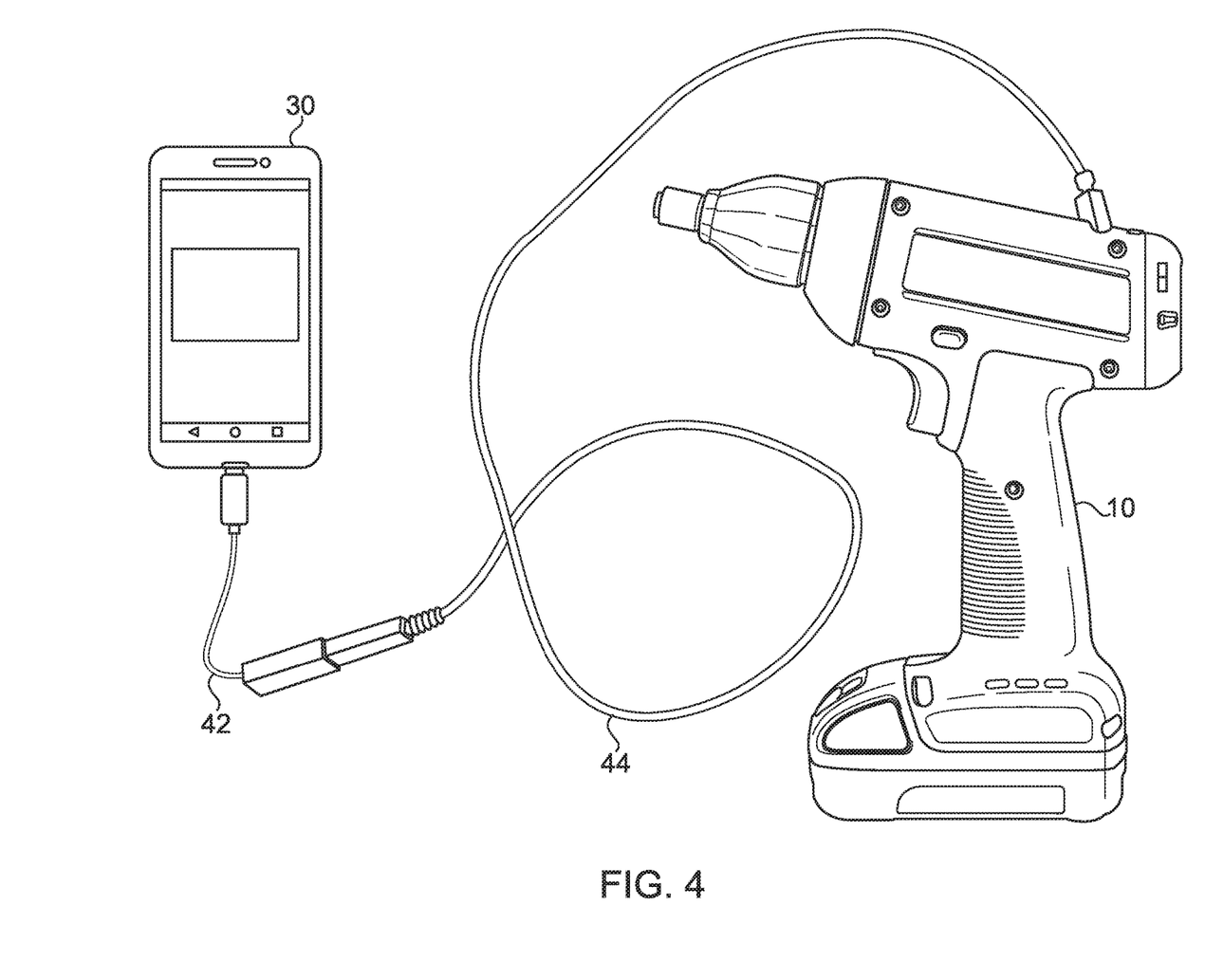
FIG. 4 illustrates some aspects of a non-limiting example of a mechanical tool communicatively coupled to the electronic tool of FIG. 3 in accordance with an embodiment of the present invention.
Figure 5:
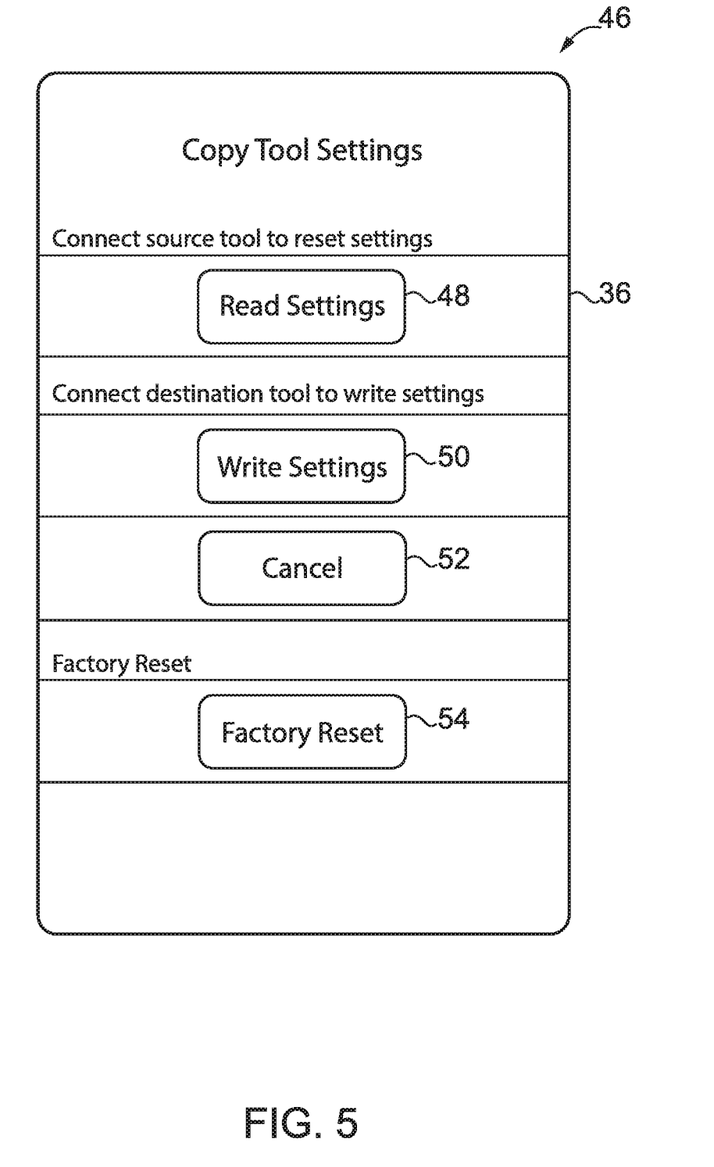
FIG. 5 illustrates some aspects of a non-limiting example of a screenshot of a graphical user interface touchscreen generated by the electronic tool of FIG. 3 in accordance with an embodiment of the present invention.

Referring also to FIGS. 4 and 5, in order to copy a plurality of settings from the source mechanical tool 10 to a destination mechanical tool 10, the user launches app 40. The source mechanical tool 10 may be communicatively coupled to electronic tool 30, for example, to communications port 38, e.g., before or after launching app 40. For example, in some embodiments, communications port 38 of electronic tool 30 may have a micro-USB connector, whereas communications port 18 of mechanical tool 10 may have a mini-USB connector. Thus, a converter cable or series of cables having a micro-USB connector at one end, e.g., the USB OTG end, and a mini-USB connector at the other end may be used to communicatively couple mechanical tool 10 to electronic tool 30. One or more other converter cables may be employed to convert between the type of connector associated with communications port 38 of electronic tool 30 and with the type of connector associated with communications port 18 of mechanical tool 10. In the non-limiting example of FIG. 5, a connector cable 42 that converts from a micro-USB connector to a USB connector is used in conjunction with a connector cable 44 that converts from a USB connector to a mini-USB connector to communicatively couple mechanical tool 10 to electronic tool 30. In other embodiments, a single converter cable may be employed. In some embodiments, app 40 is constructed to automatically recognize the mechanical tool 10 and the established connection with mechanical tool 10 when the user connects the electronic tool 30 to the mechanical tool 10, e.g., before, during or after launch of app 40.

When app 40 is launched to copy the settings, in some embodiments, a single simple-to-use screen 46 is generated by app 40 and displayed on the graphical user interface touchscreen 36. In other embodiments, multiple screens may be employed. App 40 generates a plurality of buttons on screen 46. One such button is a read button 48, e.g., a "Read Settings" button 48. In addition, a write button 50 (e.g., a "Write Settings" button 50); and a cancel button 52 (e.g., a "Cancel" button 52) as also generated by app 40 on screen 46 displayed on the graphical user interface (touchscreen) 36. In some embodiments, a factory reset button 54 (e.g., a "Factory Reset" button 54) may be generated by app 40 on screen 46 displayed on the graphical user interface (touchscreen) 36. In other embodiments, app 40 may generate any number of suitable buttons on any number of screens displayed on graphical user interface (touchscreen) 36.

When the read button is engaged, i.e., when the read button is pressed, tapped, clicked, or the like, e.g., with a human finger and/or thumb, or with a stylus or other contrivance, the read button is operative to initiate the process of reading a plurality of settings from the connected mechanical tool 10, e.g., the source mechanical tool 10, using electronic tool 30. The reading process is executed by app 40. In some embodiments, once the read button 48 is engaged, read button 48 is subsequently disabled, preventing the user from attempting to start a read process while an existing read process is proceeding. Similarly, in some embodiments, the write button 50 is disabled during the read process. The cancel button 52 is enabled during the read process, allowing the user to cancel the ongoing read process by engaging the cancel button. That is, engagement of the cancel button is operative to terminate reading (or writing) of the plurality of settings when engaged. In some embodiments, the factory reset button is disabled during the read process, e.g., but enabled after completion of the read process.

During the reading process, app 40 acquires desired settings from source mechanical tool 10 via the USB connection (e.g., via communication port 18, cables 42, 44 and communications port 38). The settings read by app 40/electronic tool 30 include wireless communication parameters/data from source mechanical tool 10. After reading the wireless communication parameters/data from source mechanical tool 10, app 40 disables the wireless communication feature of source mechanical tool 10. This prevents the source mechanical tool 10 and the subsequently written destination mechanical tool 10 from having the same wireless settings. Not doing so may result in both the source mechanical tool 10 and destination mechanical tool 10 having the same wireless settings. For example, identical communication settings on 2 wireless devices may result in communication failure with gateway 28 if both devices are simultaneously powered on. Thus, disabling the wireless communication on the source mechanical tool 10 will ensure that once the parameters have been copied to the destination mechanical tool 10, only the destination mechanical tool 10 will communicate with the wireless gateway 28.

The settings or parameters that are selected for copying from the source mechanical tool 10 to the destination mechanical tool 10 may vary with the needs of the application. In some embodiments, all parameters except the MAC address, e.g., the radio MAC address, are copied from the source mechanical tool 10 to the destination mechanical tool 10. This allows the MAC address to be kept unique to each mechanical tool 10 controller hardware. In some embodiments, the copying operation is independent of the mechanical tool 10 firmware version. In some embodiments, the copying may include copying the tool firmware and system generated data from the source mechanical tool 10 to the destination mechanical tool 10.

Once the plurality of settings are read from the source mechanical tool 10, the read button is disabled, unless the user engages the cancel button 52. After the plurality of settings are read from the source mechanical tool 10, the plurality of settings is stored in electronic tool 30, e.g., in in memory 34. In other embodiments, the plurality of settings may also or alternatively be stored in another location, e.g., another memory. The user or operator then disconnects the source mechanical tool 10 from electronic tool 30, and connects the mini-USB cable to the destination mechanical tool 10, thus communicatively coupling destination mechanical tool 10 to electronic tool 30. App 40 establishes communication with destination mechanical tool 10 and determines if the destination mechanical tool 10 is of the same model as the source mechanical tool 10. If so, write button 50 and cancel button 52 are enabled, allowing the user to engage the write button 50 to transmit all the parameters to the destination tool, or to engage cancel button 52 to cancel the process, i.e., to terminate a read or write process. In some embodiments, the destination mechanical tool 10 may not be the same model as the source mechanical tool 10. In some embodiments, reset button 54, e.g., a factory reset button is also enabled, which when engaged changes the plurality of settings to factory settings, e.g., except certain settings, such as the MAC address. The factory settings may be stored in, for example, in memory 34.

When the write button 50 is engaged, i.e., when the write button 50 is pressed, tapped, clicked, or the like, e.g., with a human finger and/or thumb, or with a stylus or other contrivance, the write button 50 is operative to initiate the process of writing the plurality of settings to the connected mechanical tool 10, e.g., the destination mechanical tool 10, using electronic tool 30. The writing process is executed by app 40. In some embodiments, once the write button 50 is engaged, read button 48 is subsequently disabled, preventing the user from attempting to start a read process while an existing write process is proceeding. Similarly, in some embodiments, write button 50 is disabled during the read process. The cancel button 52 may be enabled during the write process, allowing the user to cancel the ongoing write process. In some embodiments, the factory reset button may be disabled during the write process.

During the writing process, app 40 acquires the desired plurality of settings from the memory in which they were saved, for example and without limitation, memory 34 of electronic tool 30, in which the desired settings were saved, and writes the plurality of settings into destination mechanical tool 10, e.g., into memory 20 of destination mechanical tool 10, for example, by transmitting the plurality of settings from electronic tool 30 via communications port 38 and via cables 42 and 44 to communication port 18 of destination mechanical tool 10. The settings written by app 40/electronic tool 30 onto destination mechanical tool 10 may include wireless communication parameters/data from source mechanical tool 10 so that destination mechanical tool 10 may communicate with wireless gateway 28. After writing the wireless communication parameters/data to destination mechanical tool 10, app 40 enables the wireless communication feature of destination mechanical tool 10 so that wireless communications may be performed.

Figure 6:
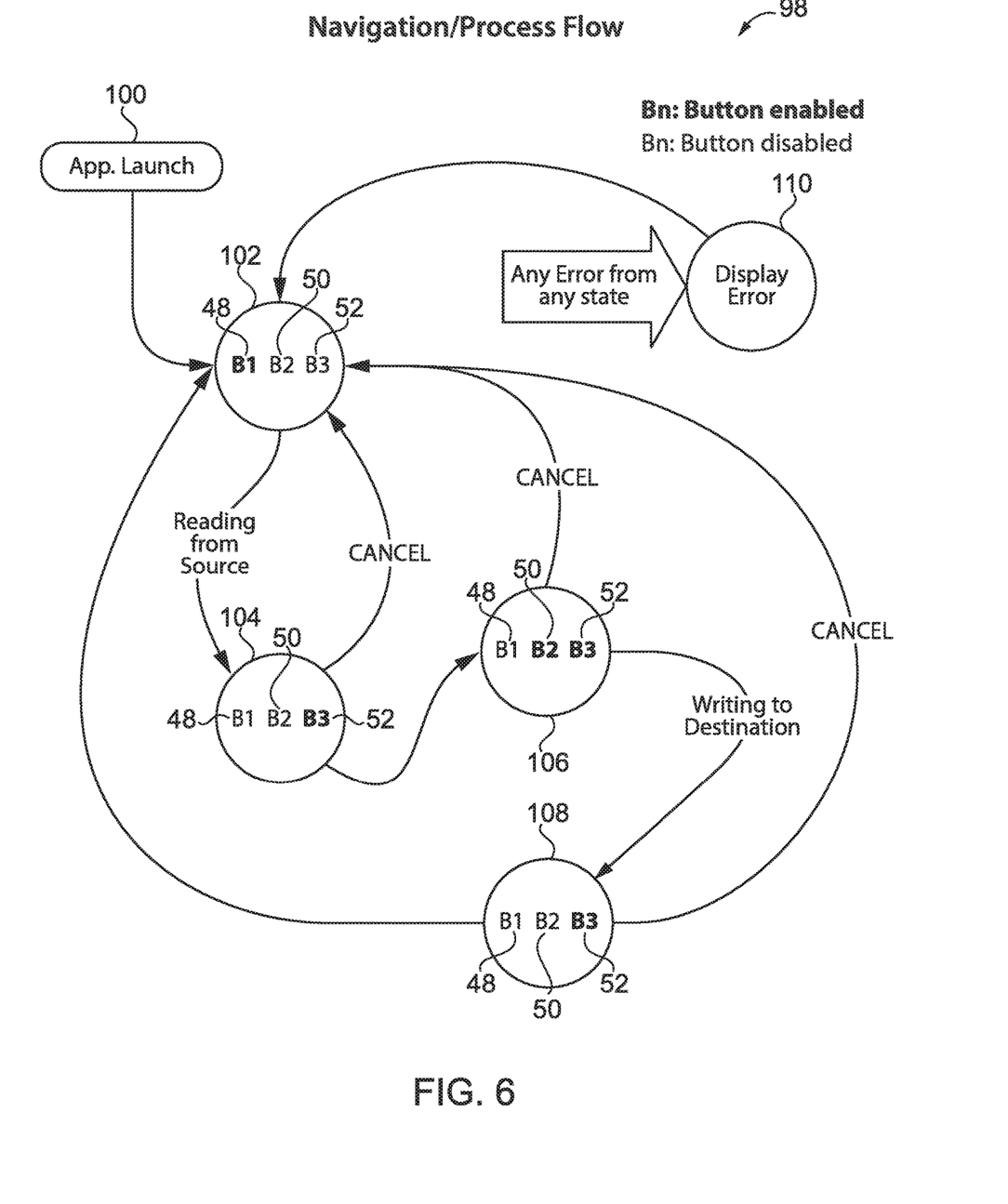
FIG. 6 illustrates some aspects of a non-limiting example of navigation/process flow of a method for copying settings from one mechanical tool to another in accordance with an embodiment of the present invention.

Referring also to FIG. 6, some aspects of a non-limiting example of navigation/process flow for a method for copying settings from one mechanical tool to another in accordance with an embodiment of the present invention is illustrated in a navigation/process diagram 98. At block 100, app 40 is launched. Source mechanical tool 10 is coupled to electronic tool 30. Process flow proceeds to block 102, where read button 48 is enabled; and write button 50 and cancel button 52 are disabled. In FIG. 6, read button 48 is indicated as "B1," write button 50 is indicated as "B2," and cancel button 52 is indicated as "B3." In the illustration of FIG. 6, factory reset button 54 is not depicted.

If at block 102, read button 48 is engaged, process flow proceeds to block 104, and the process of reading is initiated. At block 104, read button 48 is disabled, and cancel button 52 is enabled. If cancel button 52 is engaged at block 104, process flow proceeds back to block 102. Otherwise process flow proceeds to block 106, and the plurality of settings is read from source mechanical tool 10. At block 106, read button 48 is disabled; and write button 50 and cancel button 52 are enabled. Source mechanical tool 10 is disconnected from electronic tool 30, and destination mechanical tool 10 is coupled to electronic tool 30. If cancel button 52 is selected at block 106, process flow proceeds back to block 102. If write button 50 is selected at block 106, the process of writing the plurality of settings to destination tool 10 is initiated, and process flow proceeds to block 108. At block 108, read button 48 and write button 50 are disabled; and cancel button 52 is enabled. If at block 108 the cancel button 52 is engaged, process flow proceeds back to block 102. If the at block 108 the cancel button 52 is not engaged, the write process is completed, and the plurality of settings have now been written to destination mechanical tool 10. Process flow then proceeds back to block 102. If at any point during the process an error is generated, the error is displayed in graphical user interface 36 at block 110, and process flow then returns to block 102.

Figure 7:
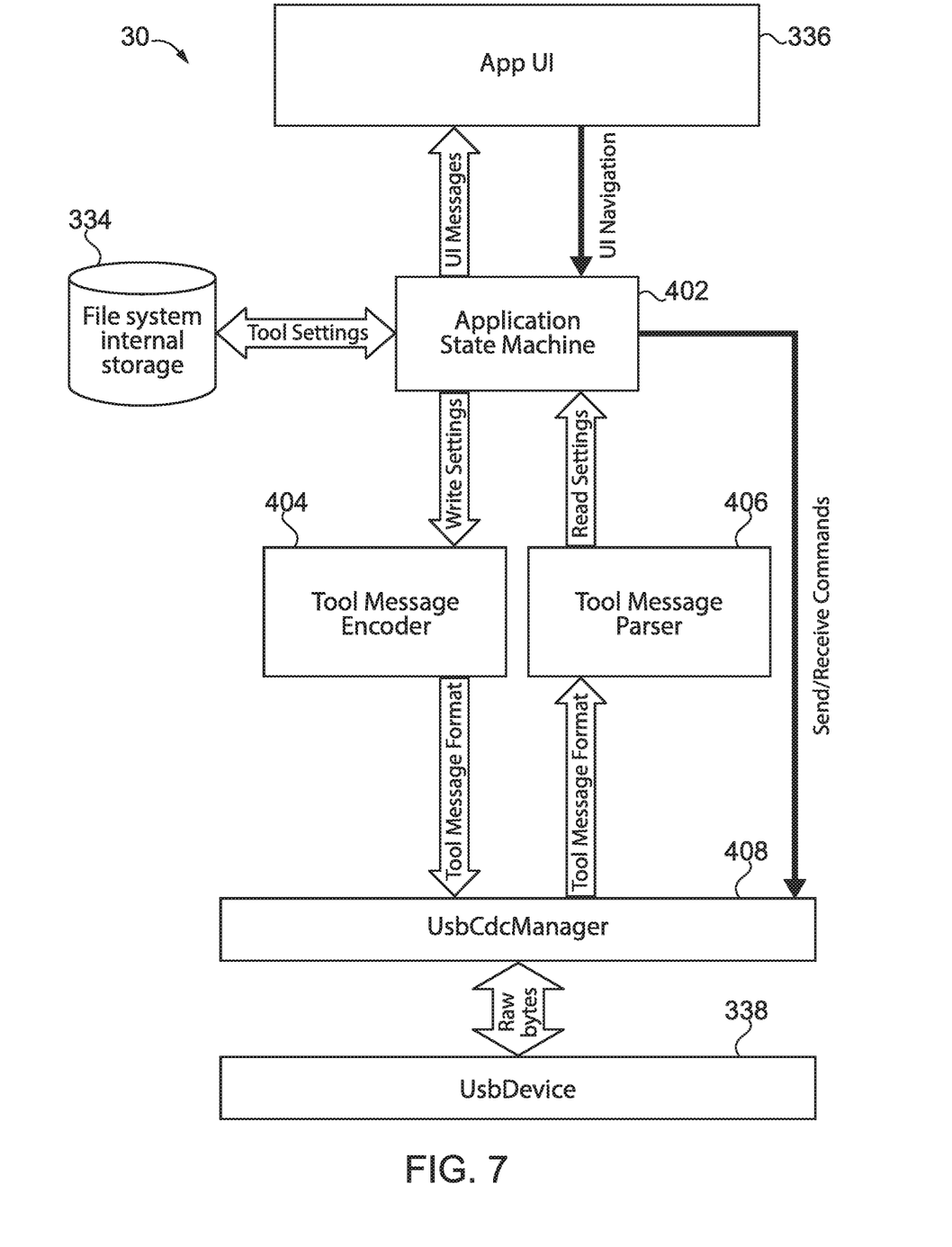
FIG. 7 illustrates some aspects of a non-limiting example of a high level functional block design diagram of an electronic tool, such as the electronic tool of FIG. 3, in accordance with an embodiment of the present invention.

Referring also to FIG. 7, some aspects of a non-limiting example of a high level functional block design diagram of electronic tool 30 are illustrated in accordance with an embodiment of the present invention. Functional blocks include a file system internal storage 334, an app UI or application user interface 336, an application state machine 402, a tool message encoder 404, a tool message parser 406, a USBCdcManager (USB communication device class manager) 408, and a USBdevice (USB device) 338.

File system internal storage 334 represents, for example, memory 34. App UI 336 represents graphical user interface 36. In some embodiments, app UI 336 block may be responsible for user interaction. App UI 336 may make use of structured layout objects and UI (user interface) controls and build the graphical user interface to the app 40. App UI 336 may invoke the functionality to read/write settings based on the user action, and in some embodiments to cancel read/write operations or to initiate a factory reset.

The application state machine 402 block is a portion of app 40, and may implement the business logic for the app 40. The application state machine 402 may be responsible for implementing the state machine 402 to read/write the configuration, general setting and wireless settings from/to the mechanical tools 10 over the USB communication, e.g., communications port 38.

The copy operation may include the Location ID of the destination mechanical tool 10 being same as the Location ID of the source mechanical tool 10. In addition, the copy operation may include the MAC ID of the destination mechanical tool 10 remaining unchanged. For example, by reading the MAC address of the destination mechanical tool 10 and setting it appropriately in the data buffer, before the page is written to the destination mechanical tool 10, the MAC ID of the destination mechanical tool 10 may remain unchanged.

File system internal storage 334 is the internal storage system of electronic tool 30, e.g., memory 34. The configuration, general setting and wireless settings read from the source mechanical tool 10 may be saved in persistent application data, e.g., in file system internal storage 334. File system internal storage 334 block may store the settings data (the plurality of settings) on the device internal memory (e.g., memory 34) as a binary file containing the bytes received from the source mechanical tool 10. When a destination mechanical tool 10 is connected, the bytes may be read from the binary file and transmitted over USB connection.

Tool Message Encoder 404 is a part of app 40. Tool Message Encoder 404 may create tool-system commands or messages from read/write commands, with a tool message header as required by the relevant specification for the specific mechanical tool 10 configuration. The tool messages will have headers for location ID, message type, the message/command and checksum.

Tool Message parser 406 is a part of app 40. Tool Message parser 406 may be responsible for parsing the response of commands from the mechanical tool 10. Tool Message parser 406 may verify the checksum and decode the tool system messages headers for location ID, message type and message data.

USBCdcManger 408 may use the UsbManager of a smartphone (e.g., Android) OS (operating system) or other OS of electronic tool 30 to request USB services, e.g., USB communications via USB device 338, e.g., communications port 38. USBCdcManger 408 may be responsible for enumeration of the USB Interfaces, setting the USB communication parameters and attach/detach notifications. The UsbDevice class represents a USB device attached to the electronic tool 30 with the electronic tool 30 acting as the USB host. In the event there is no response from mechanical tool 10 to a command for, e.g., 1 second, the electronic tool 30 will retry, e.g., 2 more times to get a response. The length of time to wait for a response and the number of retries may vary with the needs of the application. If the mechanical tool 10 does not respond after a predetermined number of commands, e.g., 3 commands, an appropriate error message will be displayed to the user, e.g., using app UI 336/graphical user interface 36.

Figure 8:
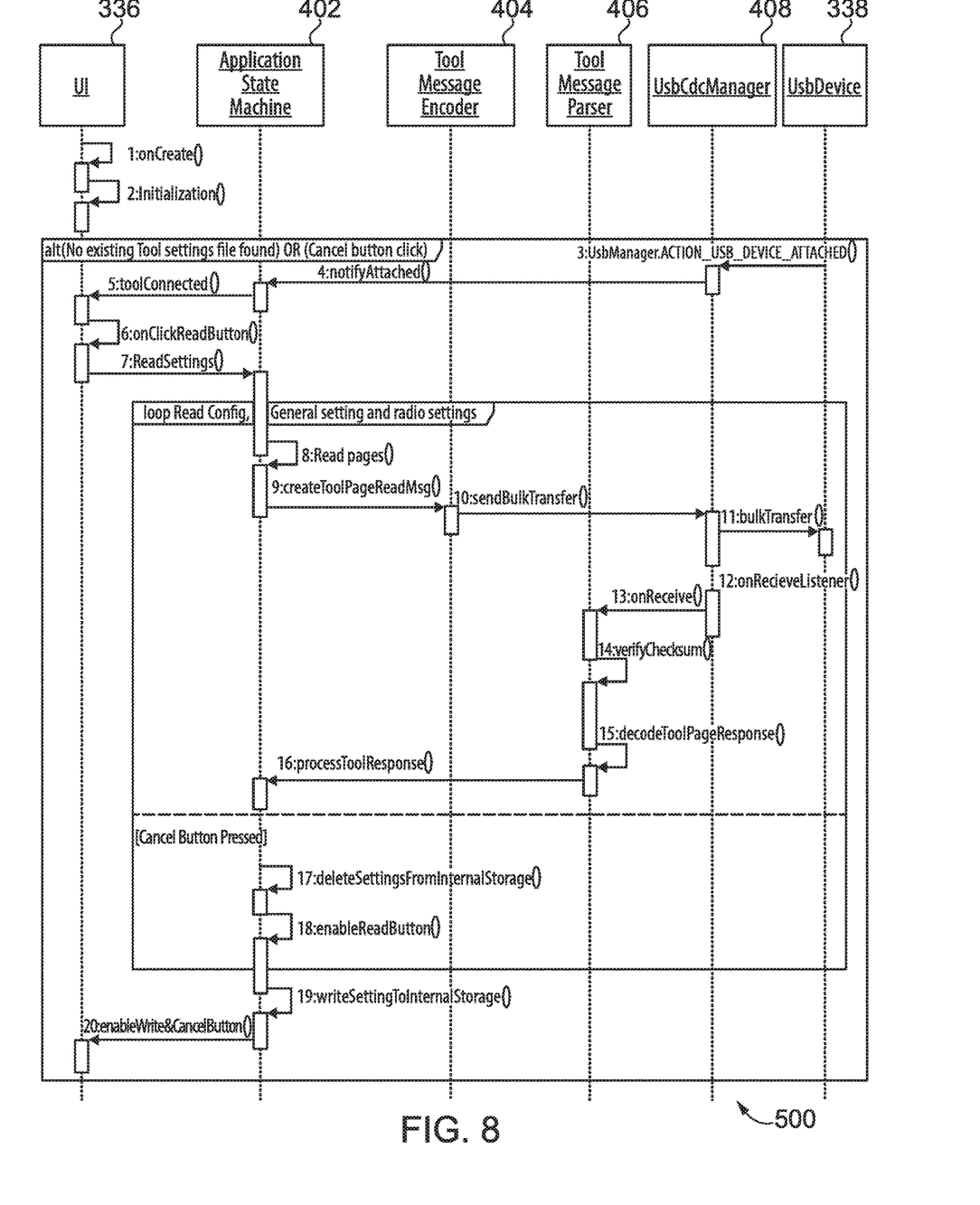
FIG. 8 illustrates some aspects of a non-limiting example of a sequence diagram for reading a plurality of settings from a mechanical tool using an electronic tool in accordance with an embodiment of the present invention.

Referring also to FIG. 8, some aspects of a non-limiting example of a sequence diagram 500 for reading a plurality of settings from a mechanical tool using an electronic tool are illustrated in accordance with an embodiment of the present invention. One skilled in the art would appreciate that the sequence diagram of FIG. 8 demonstrates one of many potential sequences that may be employed to read a plurality of settings from a mechanical tool 10 using electronic tool 30.

Figure 9:
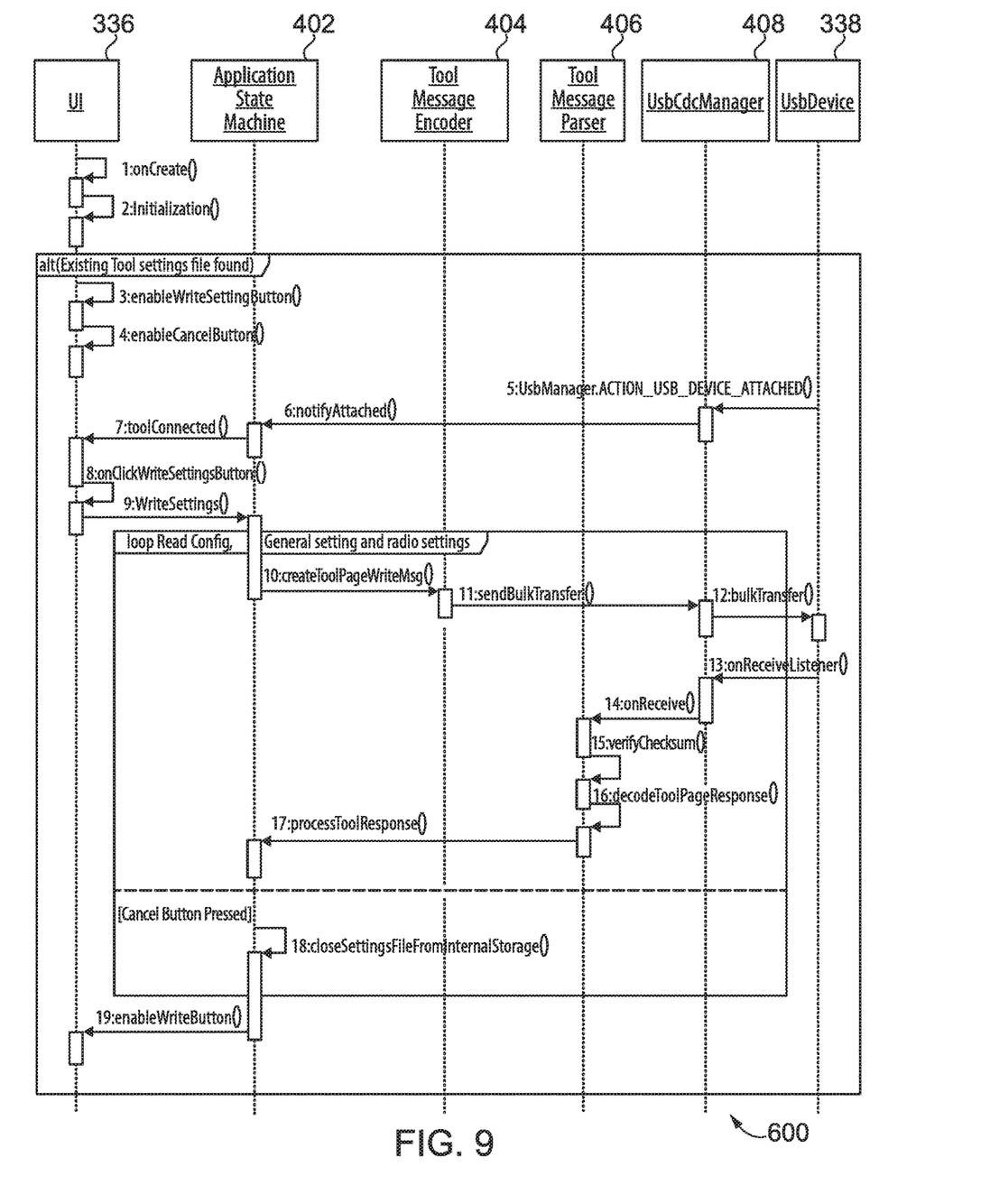
FIG. 9 illustrates some aspects of a non-limiting example of a sequence diagram for writing a plurality of settings to a mechanical tool using an electronic tool in accordance with an embodiment of the present invention.

Referring also to FIG. 9, some aspects of a non-limiting example of a sequence diagram 600 for writing a plurality of settings to a mechanical tool using an electronic tool are illustrated in accordance with an embodiment of the present invention. One skilled in the art would appreciate that the sequence diagram of FIG. 9 demonstrates one of many potential sequences that may be employed to write a plurality of settings to a mechanical tool 10 using electronic tool 30.

Figure 10:
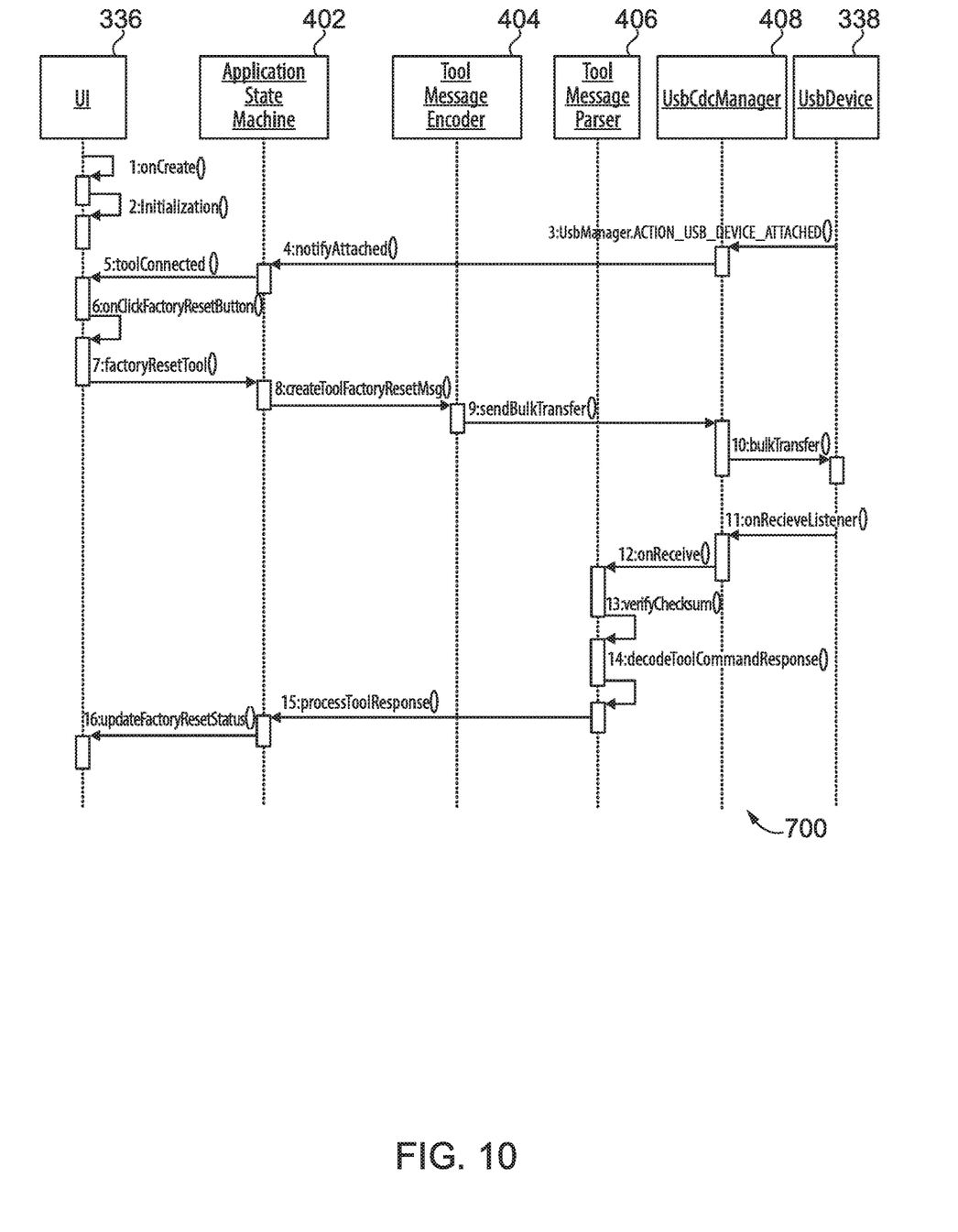
FIG. 10 illustrates some aspects of a non-limiting example of a sequence diagram for performing a factory reset of settings on a mechanical tool using an electronic tool in accordance with an embodiment of the present invention.

Referring also to FIG. 10, some aspects of a non-limiting example of a sequence diagram 700 for resetting a plurality of settings in a mechanical tool to a factory setting using an electronic tool are illustrated in accordance with an embodiment of the present invention. One skilled in the art would appreciate that the sequence diagram of FIG. 10 demonstrates one of many potential sequences that may be employed to reset a plurality of settings in a mechanical tool 10 to a factory setting(s) using electronic tool 30. The factory setting(s) may be stored in, for example, memory 34, memory 20 or any memory/storage device accessible by app 40 and electronic tool 20.

Embodiments of the present invention include a method for copying a plurality of settings from a first mechanical tool to a second mechanical tool, comprising: providing an electronic tool configured to interface with the first mechanical tool and the second mechanical tool; reading the plurality of settings from the first mechanical tool using the electronic tool; and writing the plurality of settings to the second mechanical tool using the electronic tool.

In a refinement, the method further comprises: communicatively coupling the electronic tool to the first mechanical tool prior to reading the plurality of settings from the first mechanical tool; and communicatively coupled the electronic tool to the second mechanical tool prior to writing the plurality of settings to the second mechanical tool In another refinement, the electronic tool is a smart phone.

In yet another refinement, the method further comprises storing the plurality of settings in the electronic tool after reading the plurality of settings from the first mechanical tool.

In still another refinement, the method further comprises providing a graphical user interface on the electronic tool, wherein the graphical user interface includes a read button and a write button, wherein the read button is operative, when engaged, to initiate the reading the plurality of settings from the first mechanical tool; and wherein the write button is operative, when engaged, to initiate the writing the plurality of settings to the second mechanical tool.

In yet still another refinement, the graphical user interface further includes a cancel button operative, when engaged, to terminate the reading or the writing.

In a further refinement, the graphical user interface further includes a reset button, wherein the reset button is operative, when engaged, to change the plurality of settings to factory settings.

Embodiments of the present invention include an electronic tool for copying a plurality of settings from a first mechanical tool to a second mechanical tool, comprising: a smart device having a processor, and having a non-transitory memory storing program instructions executable on the processor, wherein the program instructions are configured, when executed on the processor, to: read the plurality of settings from the first mechanical tool; and write the plurality of settings to the second mechanical tool.

In a refinement, the electronic tool includes a port constructed for communicatively coupling to the electronic tool to the first mechanical tool and/or to the second mechanical tool.

In another refinement, the electronic tool further comprises a connector cable constructed to communicatively couple the port to the first mechanical tool and/or to the second mechanical tool.

In yet another refinement, the first and second mechanical tools each have a first communications port, wherein the electronic tool includes a second communications port constructed for communicatively coupling to the electronic tool to the first mechanical tool and/or to the second mechanical tool via the first communications ports.

In still another refinement, the program instructions are configured to, when executed on the processor, store the plurality of settings in the memory after reading the plurality of settings from the first mechanical tool.

In yet still another refinement, the electronic tool includes a graphical user interface, and wherein the program instructions are configured to, when executed on the processor, generate a read button and a write button on the graphical user interface; wherein the read button is operative to initiate reading the plurality of settings from the first mechanical tool; and wherein the write button is operative to initiate writing the plurality of settings to the second mechanical tool.

In a further refinement, the program instructions are configured to, when executed on the processor, generate a cancel button on the graphical user interface; and wherein the cancel button is operative to terminate reading or writing of the plurality of settings when engaged.

In a yet further refinement, the program instructions are configured to, when executed on the processor, generate a reset button on the graphical user interface, wherein the reset button is operative to change the plurality of settings on the first mechanical tool and/or the second mechanical tool to factory settings when engaged.

Embodiments of the present invention include an apparatus, comprising: a non-transitory computer readable storage medium readable by a processor and storing program instructions executable on the processor to copy a plurality of settings from a first mechanical tool to a second mechanical tool using an electronic tool, including to: read the plurality of settings from the first mechanical tool using the electronic tool; and write the plurality of settings to the second mechanical tool using the electronic tool.

In a refinement, the non-transitory computer readable storage medium stores program instructions executable on the processor to store the plurality of settings in the electronic tool after reading the plurality of settings from the first mechanical tool.

In another refinement, the non-transitory computer readable storage medium stores program instructions executable on the processor to: generate a plurality of user interface buttons on a graphical user interface, wherein the buttons include a read button and a write button, wherein engagement of the read button is operative to said read the plurality of settings from the first mechanical tool; and wherein engagement of the write button is operative to said write the plurality of settings to the second mechanical tool.

In yet another refinement, the plurality of buttons includes a cancel button, wherein engaging the cancel button is operative to cancel said read or said write.

In still another refinement, the plurality of buttons includes a reset button, wherein the reset button, wherein engaging the reset button is operative to change the plurality of settings to factory settings for the first mechanical tool and/or for the second mechanical tool.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A method for copying a plurality of settings from a first mechanical tool to a second mechanical tool, comprising:
   providing an electronic tool configured to interface with the first mechanical tool and the second mechanical tool;
   reading the plurality of settings from the first mechanical tool using the electronic tool, the first mechanical tool in the form of a precision fastening tool operative to drive fasteners at a speed and/or torque value, the settings related to a predefined speed and/or predefined torque value; and
   writing the plurality of settings to the second mechanical tool using the electronic tool;
   wherein the second mechanical tool is a precision fastening tool operative to drive fasteners at a speed and/or torque value based on the plurality of settings written to the second mechanical tool as a result of the writing the plurality of settings.

2. The method of claim 1, further comprising:
   communicatively coupling the electronic tool to the first mechanical tool prior to reading the plurality of settings from the first mechanical tool; and
   communicatively coupling the electronic tool to the second mechanical tool prior to writing the plurality of settings to the second mechanical tool.

3. The method of claim 1, wherein the electronic tool is a smart phone.

4. The method of claim 1, further comprising storing the plurality of settings in the electronic tool after reading the plurality of settings from the first mechanical tool.

5. The method of claim 1, further comprising providing a graphical user interface on the electronic tool, wherein the graphical user interface includes a read button and a write button, wherein the read button is operative, when engaged, to initiate the reading the plurality of settings from the first mechanical tool; and wherein the write button is operative, when engaged, to initiate the writing the plurality of settings to the second mechanical tool.

6. The method of claim 5, wherein the graphical user interface further includes a cancel button operative, when engaged, to terminate the reading or the writing.

7. The method of claim 5, wherein the graphical user interface further includes a reset button, wherein the reset button is operative, when engaged, to change the plurality of settings to factory settings.

8. An electronic tool for copying a plurality of settings from a first mechanical tool to a second mechanical tool, the first mechanical tool and the second mechanical tool in the form of a precision fastening tool operative to drive fasteners at a speed and/or torque value, the electronic tool comprising: a smart device having a processor, and having a non-transitory memory storing program instructions executable on the processor, wherein the program instructions are configured, when executed on the processor, to:
   read the plurality of settings from the first mechanical tool, the plurality of settings including a predefined speed and/or predefined torque value which relate to the speed and/or torque value that the first mechanical tool can be driven; and
   write the plurality of settings to the second mechanical tool.

9. The electronic tool of claim 8, wherein the electronic tool includes a port constructed for communicatively coupling to the electronic tool to the first mechanical tool and/or to the second mechanical tool.

10. The electronic tool of claim 9, further comprising a connector cable constructed to communicatively couple the port to the first mechanical tool and/or to the second mechanical tool.

11. The electronic tool of claim 8, wherein the first and second mechanical tools each have a first communications port, wherein the electronic tool includes a second communications port constructed for communicatively coupling to the electronic tool to the first mechanical tool and/or to the second mechanical tool via the first communications ports.

12. The electronic tool of claim 8, wherein the program instructions are configured to, when executed on the processor, store the plurality of settings in the memory after reading the plurality of settings from the first mechanical tool.

13. The electronic tool of claim 8, wherein the electronic tool includes a graphical user interface, and wherein the program instructions are configured to, when executed on the processor, generate a read button and a write button on the graphical user interface; wherein the read button is operative to initiate reading the plurality of settings from the first mechanical tool; and wherein the write button is operative to initiate writing the plurality of settings to the second mechanical tool.

14. The electronic tool of claim 13, wherein the program instructions are configured to, when executed on the processor, generate a cancel button on the graphical user interface; and wherein the cancel button is operative to terminate reading or writing of the plurality of settings when engaged.

15. The electronic tool of claim 13, wherein the program instructions are configured to, when executed on the processor, generate a reset button on the graphical user interface, wherein the reset button is operative to change the plurality of settings on the first mechanical tool and/or the second mechanical tool to factory settings when engaged.

16. An apparatus, comprising:
a non-transitory computer readable storage medium readable by a processor and storing program instructions executable on the processor to copy a plurality of settings from a first mechanical tool to a second mechanical tool using an electronic tool, including to:
read the plurality of settings from the first mechanical tool using the electronic tool, the first mechanical tool in the form of a precision fastening tool operative to drive fasteners at a speed and/or torque value, the plurality of settings including a predefined speed and/or predefined torque value which relate to the speed and/or torque value that the first mechanical tool can be driven; and
write the plurality of settings to the second mechanical tool using the electronic tool, the second mechanical tool in the form of a precision fastening tool operative to drive fasteners at a speed and/or torque value.

17. The apparatus of claim 16, wherein the non-transitory computer readable storage medium stores program instructions executable on the processor to store the plurality of settings in the electronic tool after reading the plurality of settings from the first mechanical tool.

18. The apparatus of claim 17, wherein the non-transitory computer readable storage medium stores program instructions executable on the processor to: generate a plurality of user interface buttons on a graphical user interface, wherein the buttons include a read button and a write button, wherein engagement of the read button is operative to said read the plurality of settings from the first mechanical tool; and wherein engagement of the write button is operative to said write the plurality of settings to the second mechanical tool.

19. The apparatus of claim 18, wherein the plurality of buttons includes a cancel button, wherein engaging the cancel button is operative to cancel said read or said write.

20. The apparatus of claim 18, wherein the plurality of buttons includes a reset button, wherein the reset button, when engaged, is operative to change the plurality of settings to factory settings for the first mechanical tool and/or for the second mechanical tool.

* * * * *